(12) United States Patent
Hagner

(10) Patent No.: US 8,303,793 B2
(45) Date of Patent: Nov. 6, 2012

(54) METHOD OF PROVIDING ELECTRIC CURRENT TAKER FOR SUPPORT BAR, AND SUPPORT BAR

(75) Inventor: Niko Hagner, Pori (FI)

(73) Assignee: Valvas Oy, Pori (FI)

( * ) Notice: Subject to any disclaimer, the term of this patent is extended or adjusted under 35 U.S.C. 154(b) by 160 days.

(21) Appl. No.: 13/002,068

(22) PCT Filed: Jun. 25, 2009

(86) PCT No.: PCT/FI2009/050570
§ 371 (c)(1),
(2), (4) Date: Jan. 24, 2011

(87) PCT Pub. No.: WO2010/000930
PCT Pub. Date: Jan. 7, 2010

(65) Prior Publication Data
US 2011/0180400 A1      Jul. 28, 2011

(30) Foreign Application Priority Data
Jul. 2, 2008  (FI) ..................................... 20085686

(51) Int. Cl.
C23C 28/02    (2006.01)
C25B 9/02     (2006.01)
C25B 9/04     (2006.01)

(52) U.S. Cl. ........ 205/184; 205/191; 205/366; 205/369; 205/602; 205/603; 205/609; 204/279; 204/286.1; 204/288.2; 204/297.01

(58) Field of Classification Search ............ 204/279, 204/286.1, 288.2, 297.01; 205/184, 191, 205/366, 369, 602, 603, 609
See application file for complete search history.

(56) References Cited

U.S. PATENT DOCUMENTS
4,352,450 A    10/1982  Edgington
4,424,408 A *   1/1984  Elarde .......................... 174/257
4,532,152 A *   7/1985  Elarde .......................... 216/13
(Continued)

FOREIGN PATENT DOCUMENTS
FI          114926 B       1/2005
(Continued)

OTHER PUBLICATIONS
Internet document, "HTS-2000 Second Generaton Fluxless Brazing Rod", HTS-2000 World's strongest, fastest and easiest Aluminum Repair!, pp. 1-9.
(Continued)

*Primary Examiner* — Bruce Bell
(74) *Attorney, Agent, or Firm* — Birch, Stewart, Kolasch & Birch, LLP

(57) ABSTRACT

The invention relates to a method of providing an electric current taker made from silver and having a highly electroconductive contact surface into an aluminium support bar to be used in electrolysis. In order for the support bar and the electric current taker therein to be easily, quickly and inexpensively manufactured, the method comprises a) heating a first end of the support bar and providing on top of it a solder containing a substance whose affinity to oxygen is high after a temperature of an aluminium surface is at a temperature which exceeds a melting temperature of the solder, whereby the solder is spread in a molten state on top of the surface, b) breaking an aluminium oxide layer between the aluminium and the molten solder by a mechanical treatment so that oxygen is released from the aluminium oxide layer, the oxygen reacting with the substance of the solder having a high affinity to oxygen and forming, together with the substance, on the surface of the molten solder an oxide layer, and c) providing, on top of the solder, the electric current taker and letting the solder to solidify and the electric current taker to become attached to the solidified solder. The invention further relates to a support bar.

16 Claims, 1 Drawing Sheet

U.S. PATENT DOCUMENTS

| | | |
|---|---|---|
| 5,147,471 A | 9/1992 | Kronberg |
| 7,425,257 B2 * | 9/2008 | Osara et al. .................. 205/603 |
| 2006/0108230 A1 | 5/2006 | Osara et al. |
| 2006/0163079 A1 * | 7/2006 | Osara et al. .................. 205/184 |

FOREIGN PATENT DOCUMENTS

| | | |
|---|---|---|
| FI | 114927 B | 1/2005 |
| WO | WO 2004/042121 A1 | 5/2004 |
| WO | WO 2006/117425 A1 | 11/2006 |

OTHER PUBLICATIONS

Internet-document http://web.archive.org/web/20080128152423/www.techno-weld.co.uk/home.html, "A Revolution in Aluminum welding", pp. 1-12.

Internet-document, http://www.oulu.fi/elme/ELME2/PDF/Al-kylmahitsaus.pdf,"Ohutlevyalan uudet menetelmät" -projektin tutkimustiivistelmä, Alumiinin "kylmäjuotoshitsaus", Sep. 13, 2006, p. 1-5, col. 1, whole document.

* cited by examiner

METHOD OF PROVIDING ELECTRIC CURRENT TAKER FOR SUPPORT BAR, AND SUPPORT BAR

BACKGROUND OF THE INVENTION

The invention relates to a method of providing an electric current taker made from silver or silver-based alloy and having a highly electroconductive contact surface onto a surface of a first end of an aluminium support bar to be used in electrolysis, which support bar via the electric current taker is to be supported against a busbar used in connection with an electrolysis basin.

The invention also relates to an aluminium support bar to be used in electrolysis, whose first end comprises an electric current taker made from silver or silver alloy and having a highly electroconductive contact surface, which support bar via the electric current taker is to be supported against a busbar used in connection with an electrolysis basin.

From FI patent publication 114926 a method is known wherein an electric current taker made from silver or silver alloy is provided at an end of a support bar by coating, using thermal spray coating. The electric current taker forms a metallurgic bond with aluminium. The thermal spray coating requires a highly skilled performer. Further, the end result is not particularly good in terms of electroconductivity and strength since in practice it is very difficult to achieve a good metallurgic bond between aluminium and silver with good electroconductivity. Prior to coating, the materials to be coated have to be cleaned from oxide layers e.g. by sandblasting or wire brushing since otherwise no good contact/joint can be obtained with the coating. The cleaning work is time-consuming and does not always ensure a good end result. After the coating, a short thermal treatment may be carried out to strengthen the joint. Naturally, the thermal treatment adds to the amount of work. FI patent publication 114926 also discloses that the aluminium bar may first be coated with copper, after which a final coating is carried out with silver or silver alloy. The latter procedure is complicated.

From FI patent publication 114927 a method is known wherein an electric current taker made from silver or silver alloy is provided at an end of a support bar by coating, whereby the coating is made on top of a copper contact piece adhered to the end of the support bar, and using a transmission layer which forms a metallurgic joint with the copper contact piece. The transmission layer is made from tin or a tin-based alloy and it is brought onto the contact piece by soldering. The electric current taker is provided on top of the transmission layer either by soldering or by thermal spray coating. The process of adhering the copper contact piece to the aluminium bar increases the manufacturing costs of the support bar. Providing the electric current taker by thermal spray coating requires a highly skilled performer.

From WO publication 2006/117425 a method is known of attaching a silver piece to an end of an aluminium support bar so as to achieve an electric current taker. The purpose of the method is to produce an eutectic reaction between the silver piece and aluminium. It is difficult to attach the silver piece to the underlying aluminium surface. The aluminium bar has to be heated in stages and after heating an oxide layer has to be removed therefrom before the silver piece is attached thereto. The removal of the oxide layer, i.e. cleaning, is carried out e.g. by abrasion. In order to control the oxidation reactions, it is advisable to carry out the heating in a reductive atmosphere, the creation of which naturally involves special arrangements as compared to being able to carry out the heating in the surrounding air. There is not much tolerance in the heating temperatures of the support bar, either, which is why the heating requires a highly accurate performer. In addition, the silver piece has to be pressed at a certain pressure against the heated aluminium surface in order to produce a joint. Advisably, the pressing is carried out in a spot-like manner and repeated cyclically. All in all, the work requires a highly accurate performer and takes a lot of time.

BRIEF DESCRIPTION OF THE INVENTION

An object of the invention is to provide a method which eliminates the above-mentioned problems of the prior art, or at least substantially alleviates them, and which enables an easy, quick and inexpensive manufacture of a support bar and an electric current taker thereto.

The present invention provides a method of providing an electric current taker made from silver or silver-based alloy and having a highly electroconductive contact surface onto a surface of a first end of an aluminium support bar to be used in electrolysis, which support bar via the electric current taker is to be supported against a busbar used in connection with an electrolysis basin, the method comprising the steps of a) heating the first end of the support bar having an aluminium surface and providing the heated aluminium surface with a zinc-based solder containing a substance whose affinity to oxygen is high after the aluminium surface is at a temperature which exceeds a melting temperature of the solder, and spreading the solder is in a molten state on top of the surface over a surface area of a desired extent so that the surface is provided with a solder in a molten state, b) breaking an aluminium oxide layer between the aluminium and the molten solder by a mechanical treatment so that oxygen is released from the aluminium oxide layer, the oxygen reacting with the substance of the solder having a high affinity to oxygen and forming, together with the substance, on the surface of the molten solder an oxide layer, and c) providing, on top of the solder residing over the surface area, the electric current taker made from silver or silver-based alloy, and letting the solder to solidify and the electric current taker to become attached in place in the solidified solder.

The substance whose affinity to oxygen, i.e. the tendency to react with oxygen, is high must have a higher affinity to oxygen than aluminium.

Preferably, the zinc content of the zinc-based solder is 85 to 98 percent by weight, whereby the aluminium content of the solder is 1 to 10 percent by weight. The solder preferably contains 0.1 to 6 percent by weight of copper. It is feasible that copper is replaced by silver.

Preferably the substance which has a high affinity to oxygen is magnesium since when magnesium reacts with oxygen, a large amount of heat is generated which causes the aluminium to melt, whereby a tight and strong bond is formed between the solder and the aluminium which is also very electroconductive. The magnesium oxide being formed rises to the surface of the solder.

The most important advantages of the method according to the invention are that it enables the support bar to be provided with a highly electroconductive contact surface and an electric current taker in an easy and quick manner. The method is simple and easy enough to carry out to enable practically anyone with no special skills to perform it successfully. The method may be implemented very economically.

The support bar according to the invention is characterized in that between the electric current taker and the support bar, a zinc-based solder is provided which is arranged to attach the electric current taker to the support bar. Preferably, the alloy is melted in to the aluminium.

Preferably, the electric current taker is a silver piece or a silver alloy piece whose thickness is 0.4 to 2.2 mm.

The most important advantages of the support bar according to the invention are that its electroconductivity and strength in the usage environment are very good while at the same time it is very inexpensive to implement.

BRIEF DESCRIPTION OF THE FIGURES

In the following, the invention will be described in closer detail by means of an example and with reference to the accompanying drawing, in which.

DETAILED DESCRIPTION OF THE INVENTION

Figure 1:
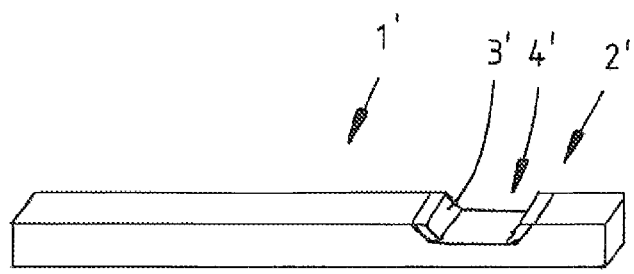
FIG. 1 shows a prior art support bar.
Figure 7:
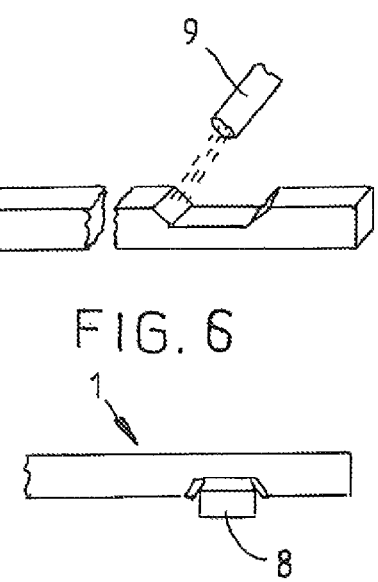
FIG. 7 shows a support bar arranged on top of a busbar.

FIG. 1 shows a prior art support bar 1'. A first end 2' of the support bar, which is made from aluminium, is provided with a copper contact piece 3'. The contact piece 3' is attached to the aluminium support bar 1' by friction welding. The contact piece 3' forms a notch 4' in the support bar. When the support bar 1' of FIG. 1 is used in zinc electrolysis, an aluminiun cathode plate (not shown) is attached to the support bar (cathode bar) and the cathode plate is lowered supported by its support bar into an electrolysis basin (not shown) such that the contact piece 3' of the support bar is placed on top of a busbar (cf. FIG. 7, part 8) provided on the edges of the electrolysis basin so that the busbar settles in the notch 4' and a second end of the support bar settles on top of an insulator (not shown). The contact piece 3' constitutes an electric current taker of the support bar. The contact of the contact piece 3' to the busbar having an angular cross section is formed of two lines.

Figure 2:
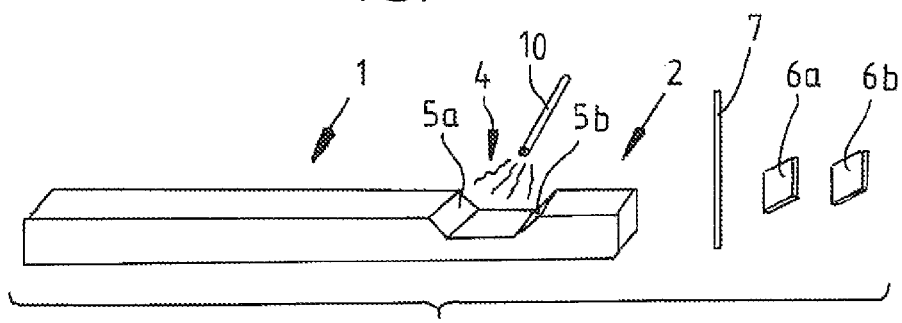
FIGS. 2 to 4 illustrate how an electric current taker is provided at an end of a support bar.
Figure 3:
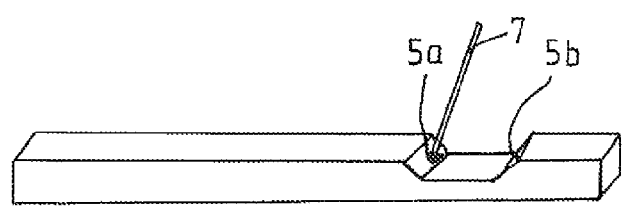
Figures 4, 6:
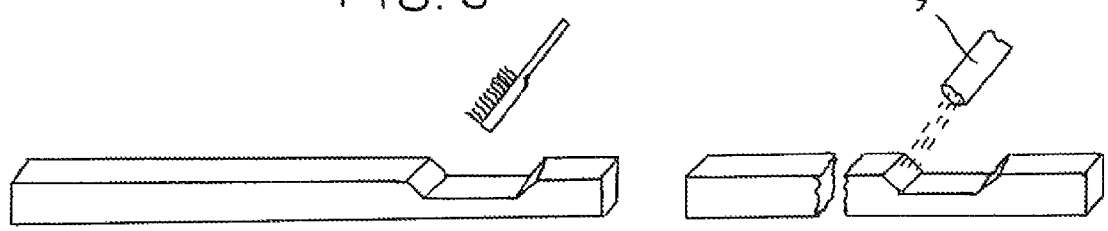
FIG. 6 illustrates an alternative way of providing an electric current taker.
Figure 5:
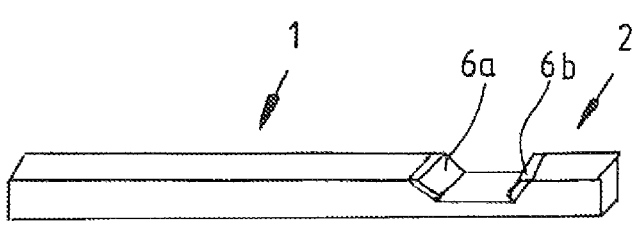
FIG. 5 shows a completed support bar.

FIGS. 2 to 4 illustrate manufacture of a support bar 1 according to the invention, shown in FIG. 5, or rather the production of an electric current taker 3 thereof.

FIG. 2 illustrates an aluminium support bar 1 which may be said to be in the form of a preform (or blank) since it lacks an electric current taker. A first end 2 of the preform is provided with a notch 4 in which an electric current taker is provided by attaching to both inclined surfaces 5a, 5b of the notch of the preform a small highly electroconductive silver plate 6a, 6b or a small highly electroconductive plate made from silver-based alloy, which plates may also be called pieces or sheets. The latter are in FIG. 2 separate from the support bar 1 but in FIG. 5 attached in place. The thickness of the plates 6a, 6b is preferably 0.4 to 2.2 mm and more preferably 0.5 to 2 mm.

In FIG. 3, reference number 7 indicates a solder wire whose usage will be explained in the following.

The solder wire 7 is a zinc-based alloy which contains 85 to 98 percent by weight of zinc, 1 to 10 percent by weight of aluminium, and 0.1 to 6 percent by weight of copper. In addition, the solder wire contains minor amounts of manganese and magnesium. A commonly available solder sold by Techno Weld Ltd, Aston Works, West End, Aston, Oxfordshire OX18 2NP, Great Britain, may be used as the solder. The solder is sold as rods (called Techno-Weld rods). It is probable that the copper contained in the solder may be replaced by silver. As an alternative to the product by Techno Weld, a product in wire form is available which is manufactured and marketed by New Technology Products, 1330 Post Oak Blvd., Suite 1600, Houston, Tex. 77056-3017, USA under the commercial name HTS-2000, whereby instructions for use provided for the particular product are to be followed. The zinc content of such a wire is ca. 80 percent by weight, the aluminium content ca. 16 percent by weight, and the copper content ca. 3 percent by weight. Additionally, the wire contains small amounts of magnesium, the magnesium content being e.g. ca. 0.2 percent by weight. Presumably the preferable zinc content is 80 to 90 percent by weight and the aluminium content 1 to 20 percent by weight.

The plates 6a, 6b are attached to the notch 4 by heating first the first end of the support bar 1 (still a preform in FIG. 2) to a temperature of about 450° C., cf. FIG. 2. Since the support bar is made from aluminium and aluminium reacts readily with the surrounding oxygen, the surface of the support bar, including the point at the notch 4, is aluminium oxide. It is known that it is very difficult to attach other metals to aluminium oxide. Nevertheless, in the method according to the invention, the notch of the support bar 1 does not have to be cleaned from oxides. The heating temperature is not critical, preferably it is in the range of 370 to 550° C., but it may also be in the range of 300 to 600° C. If the temperature range is outside a range of 260 to 620° C., it can be expected that no desired result is achieved. A danger in heating to a very high temperature is also the risk that the aluminium bar melts down (the melting point of aluminium is about 660° C.). The heating temperature may be preferably followed by measuring the temperature of the surface of the end 2. It is not, however, necessary or even required to measure the temperature when it is known how the solder wire 7 is to behave on the surface of the heated end 2 of the support bar. Preferably, the heating is carried out by a gas flame (propane, butane or acetylene flame), in which case a torch pipe 10 is kept moving so as not to cause too high a local heating. It is also feasible that the heating is carried out by electric induction or electric resistance. A drawback of induction heating is, however, that aluminium melts rather quickly. Heating by an electric resistance, in turn, is slow. However, induction heating and resistance heating may be used in order to provide a so called basic heating. The purpose of the basic heating is to provide preheating which speeds up the manufacture of the support bars when manufacturing volumes are large: heating, by using a flame, a support bar pre-heated with electricity to a working temperature only takes little time. After an electric current taker has been attached to a support bar that has just been manufactured, the process proceeds to providing a next support bar with an electric current taker, which has been preheated already.

Periodically, the solder wire 7 is placed against the heated surface and it is checked whether it sticks to the material underneath. After the temperature has risen high enough for the wire to melt down, heated by the material underneath it, the molten solder is spread on the inclined surfaces 5a, 5b by slightly moving the solder wire across the inclined surfaces, whereby the solder spreads on the surfaces 5a, 5b. It is to be noted that the solder 7 is to melt down, heated by the material underneath, and the solder is not to be heated by the torch pipe 10.

After this, the molten metallic surface is brushed with a brush made from stainless steel or brass. The brushing is a very short and easy procedure. Typically, a brushing of two or three seconds is sufficient. Owing to the brushing, the aluminium oxide layer underneath the solder is broken and it changes into aluminium and oxygen. The manganese contained in the solder possibly promotes the breaking down of the aluminium oxide layer. The oxygen released in the brushing reacts with the magnesium contained in the solder since magnesium has a high tendency to react with oxygen. Magnesium reacts with oxygen more readily than aluminium, so it may be said that magnesium deprives aluminium of oxygen. This is important in order to get oxygen out of aluminium. When magnesium reacts with oxygen, an exothermic reaction takes place, which releases heat. Owing to the released heat, the temperature rises locally above the melting point of aluminium, which is why the solder sticks very well to the underlying aluminium surface. The density of magnesium oxide is very low as compared to the density of the solder, so it rises to the surface of the solder, resulting in an extremely good joint being formed between the solder and the underlying aluminium. Preferably, the solder contains magnesium at least 0.01 percent by weight, the preferred amount of magnesium being e.g. 0.05 to 0.3 percent by weight. Instead of magnesium, it is feasible that some other substance might be used whose affinity to oxygen is higher than the affinity to oxygen of aluminium and which with oxygen forms an oxide whose density is smaller than that of the solder in order for it to rise to the surface of the solder. Instead of the aforementioned brushing, some other mechanical treatment, such as surface scraping, may be used. While the solder is still in the molten state, the silver pieces 6a, 6b are placed on top of it, the silver pieces 6a, 6b immediately becoming engaged with the molten solder and attached strongly thereto as the solder solidifies, cf. FIG. 5 wherein the silver pieces are in place. After the solder has been solidified, a strong, highly electroconductive joint is formed. It is feasible that the silver pieces 6a, 6b are pre-coated by the solder before they are placed on top of the solder provided on top of the aluminium.

If, instead of silver pieces, pieces made from silver alloy are used, the silver alloy preferably contains a small amount of copper. The copper content is e.g. 5 percent by weight, and may vary e.g. in a range of 1 to 10 percent by weight. Owing to the copper, the mechanical strength of the pieces 6a, 6b is higher than if the pieces were made of pure silver. On the other hand, the copper in the pieces 6a, 6b slightly decreases the corrosion resistance and electroconductivity of the contact surface and the electric current taker.

The invention has been described above by means of an example, and therefore it is noted that the details of the invention may be implemented in many ways within the scope of the attached claims. Thus, it is not necessary to use pieces made from silver or silver alloy, but it is feasible that instead of them, the electric current taker is provided by thermally spraying silver or silver alloy on top of the solder, in which case the solder has been left to solidify before the spraying. The spraying is illustrated in FIG. 6. In such a case, instead of silver pieces or silver alloy pieces, an electric current taker provided by spraying thus lies topmost. In thermal spraying, for example a technique based on the burning of gas may be used. In High Velocity Oxy-Fuel spraying, the coating material (silver or silver-based alloy) is fed in powder form by means of a carrier gas to a spray pistol 9. The coating material is melted in a combustion chamber of the spray pistol, and the coating is led in a molten state towards the target to be coated. In ordinary flame spraying, a mixture of combustion gas and oxygen, as it burns, melts the coating material which initially may be in the form of powder or wire. The molten coating material is blown by means of pressurized air to its target. The thermal spraying is not explained in closer detail herein since the method is known per se to those skilled in the art. A drawback of thermal spraying as compared to using pieces of silver or silver alloy is that the thermal spraying is very difficult to carry out so that the final result is good. An advantage of thermal spraying is that it may be used for coating pieces having practically any geometrical shape.

The invention claimed is:

1. A method of providing an electric current taker made from silver or silver-based alloy and having a highly electroconductive contact surface onto a surface of a first end of an aluminium support bar to be used in electrolysis, which support bar via the electric current taker is to be supported against a busbar used in connection with an electrolysis basin, the method comprising the steps of
    a) heating the first end of the support bar having an aluminium surface and providing the heated aluminium surface with a zinc based solder containing a substance whose affinity to oxygen is high after the aluminium surface is at a temperature which exceeds a melting temperature of the solder, and spreading the solder is in a molten state on top of the surface over a surface area of a desired extent so that the surface is provided with a solder in a molten state,
    b) breaking an aluminium oxide layer between the aluminium and the molten solder by a mechanical treatment so that oxygen is released from the aluminium oxide layer, the oxygen reacting with the substance of the solder having a high affinity to oxygen and forming, together with the substance, on the surface of the molten solder an oxide layer, and
    c) providing, on top of the solder residing over the surface area, the electric current taker made from silver or silver-based alloy, and letting the solder to solidify and the electric current taker to become attached in place in the solidified solder.

2. A method as claimed in claim 1, wherein the zinc content of the zinc-based solder is 85 to 98 percent by weight and the solder having an aluminium content of 1 to 10 percent by weight.

3. A method as claimed in claim 2, wherein a solder which contains manganese is used.

4. A method as claimed in claim 1, wherein the zinc content of the zinc-based solder is 80 to 98 percent by weight, and the solder having an aluminium content of 1 to 20 percent by weight, and an copper content of 0.1 to 6 percent by weight.

5. A method as claimed in claim 4, wherein a solder which contains manganese is used.

6. A method as claimed in claim 1, wherein the substance whose affinity to oxygen is high is magnesium.

7. A method as claimed in claim 6, wherein a solder which contains manganese is used.

8. A method as claimed in claim 1, wherein heating the first end of the support bar having an aluminium surface in step a) is carried out in a temperature of 370 to 550° C.

9. A method as claimed in claim 1, wherein breaking the oxide layer between the aluminium and the solder is carried out by brushing.

10. A method as claimed in claim 1, wherein the electric current taker is brought on top of the surface area treated with the solder when the solder is in a molten state.

11. A method as claimed in claim 10, wherein the electric current taker is a silver piece or a silver alloy piece whose thickness is 0.4 to 2.2 mm.

12. A method as claimed in claim 1, wherein the electric current taker is brought on top of the surface area treated with the solder by thermal spraying.

13. An aluminium support bar to be used in electrolysis, having a first end comprising an electric current taker made from silver or silver alloy and having a highly electroconductive contact surface, which support bar via the electric current taker is to be supported against a busbar used in connection with an electrolysis basin, wherein between the electric current taker and the support bar, a zinc-based alloy is provided which is arranged to attach the electric current taker to the support bar.

14. A support bar as claimed in claim 13, wherein the zinc content of the zinc-based alloy is 80 to 98 percent by weight and the aluminium content of the zinc-based alloy is 1 to 20 percent by weight.

15. A support bar as claimed in claim 14, wherein the zinc-based alloy contains magnesium.

16. A support bar as claimed in claim 13, wherein the electric current taker is a silver piece or a silver alloy piece having a thickness of 0.4 to 2.2 mm.

* * * * *